US008732355B1

(12) United States Patent
Chan et al.

(10) Patent No.: US 8,732,355 B1
(45) Date of Patent: May 20, 2014

(54) DYNAMIC DATA PREFETCHING

(71) Applicant: NextBit Systems Inc., San Francisco, CA (US)

(72) Inventors: Michael A. Chan, San Francisco, CA (US); Justin Quan, San Francisco, CA (US); Michael K. Fleming, San Francisco, CA (US)

(73) Assignee: Nextbit Systems Inc., San Francisco, CA (US)

( * ) Notice: Subject to any disclaimer, the term of this patent is extended or adjusted under 35 U.S.C. 154(b) by 0 days.

(21) Appl. No.: 14/155,067

(22) Filed: Jan. 14, 2014

Related U.S. Application Data

(63) Continuation-in-part of application No. 14/043,082, filed on Oct. 1, 2013.

(60) Provisional application No. 61/708,794, filed on Oct. 2, 2012.

(51) Int. Cl.
*G06F 3/00* (2006.01)
*G06F 5/00* (2006.01)

(52) U.S. Cl.
USPC ............................................ 710/36; 711/137

(58) Field of Classification Search
None
See application file for complete search history.

(56) References Cited

U.S. PATENT DOCUMENTS

| 6,721,870 | B1 * | 4/2004 | Yochai et al. ................. 711/204 |
| 8,539,163 | B1 * | 9/2013 | Sivasubramanian et al. . 711/137 |
| 2002/0133537 | A1 | 9/2002 | Lau et al. |
| 2007/0067382 | A1 * | 3/2007 | Sun ............................... 709/203 |
| 2008/0071988 | A1 | 3/2008 | Schloter et al. |
| 2008/0140997 | A1 | 6/2008 | Tripathi |
| 2008/0183903 | A1 * | 7/2008 | VanStee et al. .................... 710/5 |
| 2010/0115211 | A1 * | 5/2010 | de la Iglesia et al. ......... 711/154 |
| 2011/0320558 | A1 | 12/2011 | Gross et al. |
| 2012/0151255 | A1 | 6/2012 | Lee et al. |
| 2013/0210527 | A1 * | 8/2013 | Kim et al. ......................... 463/42 |
| 2013/0318306 | A1 * | 11/2013 | Gonion ........................... 711/137 |

OTHER PUBLICATIONS

Co-Pending U.S. Appl. No. 14/042,452 by Chan, M.A. et al., filed Sep. 30, 2013.
Co-Pending U.S. Appl. No. 14/043,693 by Chan, M.A. et al., filed Oct. 1, 2013.
Co-Pending U.S. Appl. No. 14/043,082 by Chan, M.A. et al., filed Oct. 1, 2013.
Co-Pending U.S. Appl. No. 14/171,679 by Chan, M.A. et al., filed Feb. 3, 2014.
International Search Report and Written Opinion mailed Jan. 22, 2014, 10 pp., for International Application No. PCT/US2013/063003 filed Oct. 2, 2013.
Co-Pending U.S. Appl. No. 14/180,021 by Chan, M.A., et al., filed Feb. 13, 2014.

* cited by examiner

*Primary Examiner* — Elias Mamo
(74) *Attorney, Agent, or Firm* — Perkins Coie LLP

(57) ABSTRACT

Technology is disclosed for data prefetching on a computing device utilizing a cloud based file system. The technology can receive a current execution state and a data access pattern associated with an instance of an application executing on a computing device. The technology can further receive a data access pattern associated with another instance of the application executing on another computing device. The technology can utilize the received data access patterns to determine one or more future access requests for a subset of data associated with the application, where the one or more future access requests is a function of the current execution state of the application executing on the computing device. The technology can generate a prefetching profile utilizing the determined subset of data.

18 Claims, 12 Drawing Sheets

| Name | Type | Size | Access Time | Access Type | Device Location |
|---|---|---|---|---|---|
| ThunderBird.exe | full computer application | 27M | 08/11/13, 07:15PM | read | 34N 40' 50.12" |
| Proposal.doc | application data | 0.5M | 09/01/13, 02:15AM | write | 56W 22' 43.08" |

*FIG. 6B*

| Name | Type | Size | Access Type | Likelihood | Timeframe |
|---|---|---|---|---|---|
| Word.exe | full computer application | 15M | read | 80% | within a day |
| RainMan.wmv | application data | 50M | write | 45% | within a week |

*FIG. 6C*

DYNAMIC DATA PREFETCHING

PRIORITY CLAIM

This application is a continuation-in-part of U.S. patent application Ser. No. 14/043,082, filed on Oct. 1, 2013, entitled "CLOUD BASED FILE SYSTEM SURPASSING DEVICE STORAGE LIMITS", which claims the benefit of U.S. Provisional Patent Application No. 61/708,794, filed on Oct. 2, 2012, entitled "CLOUD COMPUTING INTEGRATED OPERATING SYSTEM", which are incorporated by reference herein in their entirety.

FIELD OF THE INVENTION

At least one embodiment of the present invention pertains to cloud storage service, and more particularly, performing dynamic data prefetching on a computing device utilizing a cloud based file system.

BACKGROUND

Cloud storage service is popular nowadays for providing online storage space to host user files. Users of a cloud storage service can upload files to the cloud and later access the uploaded files over the internet from the same or a different computing device.

A cloud storage service can provide client applications for different types of computing devices. A user can use a computing device to download and install a client application of the cloud storage service at the device. The client application can enable the user to drop any file into a designated folder. Any file in the designated folder is synchronized with the cloud storage service. The user can then use the device or other devices having a client application installed to access these synchronized files stored the cloud storage service. The cloud storage service can further provide a web interface. Through the web interface, a user can upload files to and download files from the cloud storage service, without the need of installing the client application.

The user needs to manually decide which files to be synchronized by dropping the files into the designated folder or drive. The designated folders or drives are generally treated as external folders or drives by the operating systems of the computing devices. The operating systems do not rely on the designated folders or drives to perform, and do not utilize the designated folders or drives to perform any operating system related tasks.

SUMMARY

Technology introduced herein provides a mechanism to enable data prefetching on a computing device utilizing a cloud based file system. According to at least one embodiment, a computing device includes a file system having multiple storage objects (e.g., files). The metadata of the storage objects are stored in local storage of the computing device. A remote storage server is responsible for storing the content data of the storage objects. The computing device presents the storage objects via an output device as if the content data are stored locally in the computing device. The computing device can further identify some of the storage objects that have a high possibility of being accessed by computer applications of the computing device, and caches the content data of these storage objects locally.

In accordance with the techniques introduced here, therefore, a method for generating a prefetching profile for storage objects associated with an application executing on a computing device is disclosed. The computing device can utilize the prefetching profile for storage objects to prefetch data. The method includes receiving, by a profile manager, a first storage object access pattern associated with a first instance of the application executing on the computing device, where a given storage object access pattern includes information regarding an access request for a given storage object from a given instance of the application.

Further, the given storage object access pattern includes information regarding a current execution state of the given instance of the application during at least one of one or more access requests for storage objects by the given instance of the application. The method includes receiving, by the profile manager, a second storage object access pattern associated with a second instance of the application executing on another computing device.

The method further includes receiving, by the profile manager, a current execution state of the first instance of the application executing on the computing device. The method includes utilizing the first storage object access pattern and the second storage object access pattern to determine, by the profile manager, one or more future access requests for a subset of storage objects associated with the application, where the one or more future access requests is a function of the current execution state of the first instance of the application.

The method further includes generating, by the profile manager, the prefetching profile utilizing the determined subset of storage objects. The computing device utilizes the prefetching profile and a metadata associated with the storage objects to gather content associated with one or more storage objects of the subset of storage objects, where the content associated with the given storage object is stored in a storage server while the metadata associated with the given storage object being stored in the computing device.

Other aspects of the technology introduced here will be apparent from the accompanying figures and from the detailed description which follows.

BRIEF DESCRIPTION OF THE DRAWINGS

These and other objects, features and characteristics of the present invention will become more apparent to those skilled in the art from a study of the following detailed description in conjunction with the appended claims and drawings, all of which form a part of this specification. In the drawings:

FIG. 6B contains a diagram illustrating an example usage profile maintained by a local profile manager.

FIG. 6C contains a diagram illustrating an example prefetching profile received by a local profile manager.

DETAILED DESCRIPTION

References in this specification to "an embodiment," "one embodiment," or the like, mean that the particular feature, structure, or characteristic being described is included in at least one embodiment of the present invention. Occurrences of such phrases in this specification do not all necessarily refer to the same embodiment, however.

Figure 1:
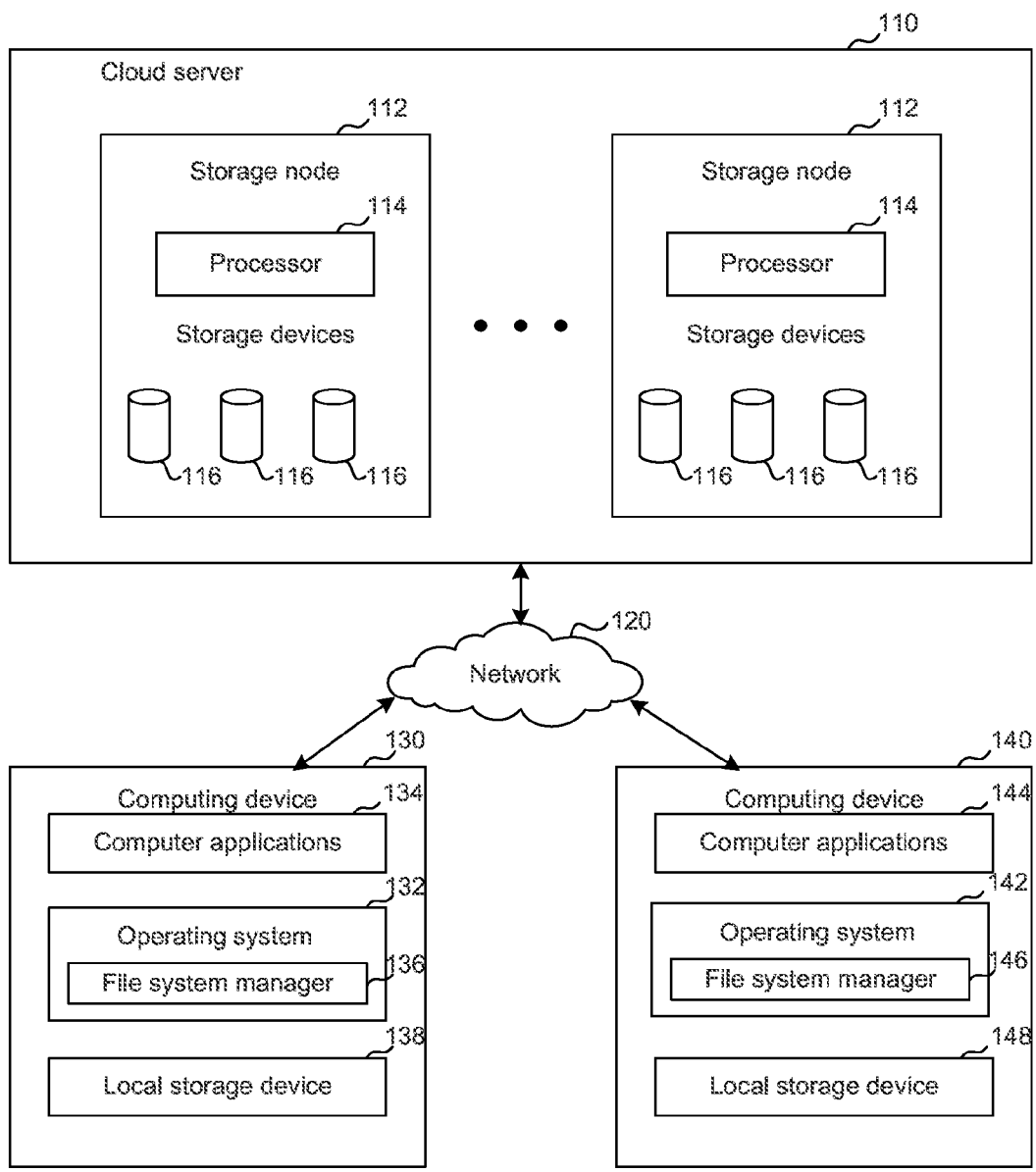
FIG. 1 illustrates an example system for computing devices connected to a cloud storage server.

FIG. 1 illustrates an example system for computing devices connected to a cloud storage server. The system includes a cloud server 110 configured to communicate with the computing devices. In one embodiment, the cloud server 110 can be a server cluster having computer nodes interconnected with each other by a network. The cloud server 110 can contain storage nodes 112. Each of the storage nodes 112 contains one or more processors 114 and storage devices 116. The storage devices can include optical disk storage, RAM, ROM, EEPROM, flash memory, phase change memory, magnetic cassettes, magnetic tapes, magnetic disk storage or any other computer storage medium which can be used to store the desired information.

The computing devices 130 and 140 can each communicate with the cloud server 110 via network 120. The network 120 can be, e.g., the Internet. Although FIG. 1 illustrates two computing devices 130 and 140, a person having ordinary skill in the art will readily understand that the technology disclosed herein can be applied to a single computing device or more than two computing devices connected to the cloud server 110.

The computing device 130 includes an operating system 132 to manage the hardware resources of the computing device 130 and provides services for running computer applications 134 (e.g., mobile applications running on mobile devices). The computer applications 134 stored in the computing device 130 require the operating system 132 to properly run on the device 130. The computing device 130 includes at least one local storage device 138 to store the computer applications and user data. The computing device 130 or 140 can be a desktop computer, a laptop computer, a tablet computer, an automobile computer, a game console, a smart phone, a personal digital assistant, or other computing devices capable of running computer applications, as contemplated by a person having ordinary skill in the art.

The computer applications 134 stored in the computing device 130 can include applications for general productivity and information retrieval, including email, calendar, contacts, and stock market and weather information. The computer applications 134 can also include applications in other categories, such as mobile games, factory automation, GPS and location-based services, banking, order-tracking, ticket purchases or any other categories as contemplated by a person having ordinary skill in the art.

The operating system 132 of the computing device 130 can include a file system manager 136 to manage the file system of the computing device 130. Instead of storing all content data of the files of the file system directly in the local storage device 138 of the computing device 130, the file system manager 136 can identify certain portions of the files suitable to be stored at the cloud server 110. The file system manager can store metadata of the files in the local storage device 138 and sends out content data of the files to the cloud server 110 so that the cloud server 110 stores the content data.

The computer applications 134 running at the computing device 130 need not be aware that the content data of the files are stored in the cloud server 110, instead of the local storage device 138. The computer applications 134 can read data from or write data to the files as if the files are stored in the local storage device 138. For instance, the computer applications 134 can generate read or write request having a location link of the file, in order to read or write data from a specific location of the file. The file system manager 136 is responsible to retrieve the content data of the file from the cloud server 110 to satisfy the read or write requests. The file system manager 136 can further cache certain content data of one or more files, when the file system manager 136 determines that these files has a high probability to be read or written by the applications 134 of the computing device 130.

Figure 2:
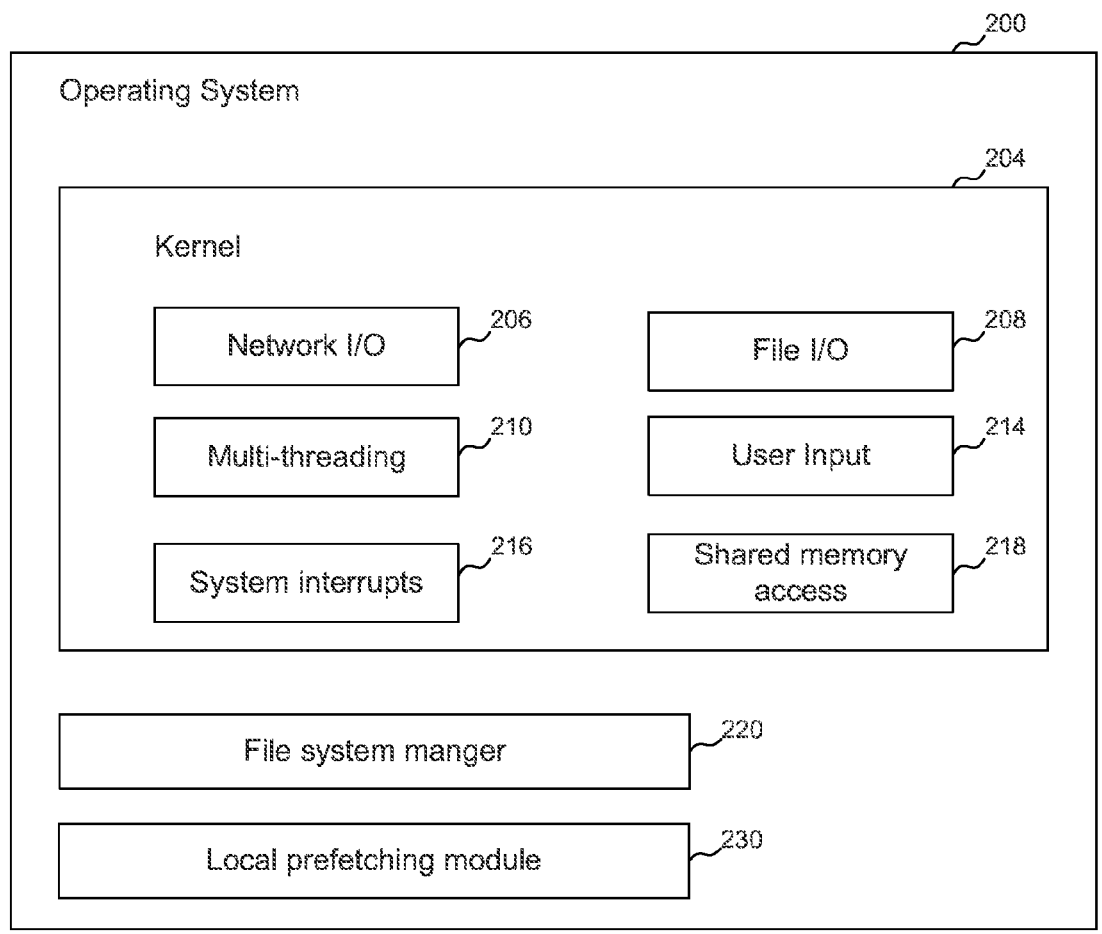
FIG. 2 contains a diagram illustrating an example operating system of a computing device.

In order to manage the files with content data stored in a remote cloud storage server, the operating system of the computing device can include a file manager module and a local prefetching module. FIG. 2 illustrates an example operating system 200 including a file manager module 220 and a local prefetching module 230. In one embodiment, the operating system 200 includes a kernel 204. The kernel 204 controls the computer applications running on top of the kernel 204. It provides interfaces to the hardware of the electronic device, thereby isolating the computer applications from the hardware. It may also include one or more intervening sources that can affect the execution of a computer application. For example, the kernel 204 may include a network I/O module 206, a file I/O module 208, a multi-threading module 210, a user input module 214, a system interrupts module 216, and a shared memory access module 218.

In one embodiment, the file system manager 220 is responsible for managing a file system including files with content data stored in a remote cloud storage server. The file system manager 220 can run on top of the kernel 204 as illustrated in the FIG. 2, or run as a part of the customized kernel 204. The local prefetching module 230 can also run on top of the kernel 204, or run as a part of the customized kernel 204. As one example, the local prefetching module 230 can run in a user space file system (e.g. FUSE) on top of a Linux or Android kernel. The local prefetching module 230 can be a module of the operating system 200 separate from the file system manager 220, or alternatively performs as a part of the file system manager 220.

The file system manager 220 maintains a file system including multiple files. The metadata of the files are stored in the local storage, while the content data of the files are stored in a remote cloud storage server. The file system manager 220 presents the files to the applications and users of the computing device, as if the content data are stored locally. The local prefetching module 230 is responsible to retrieve content data from the storage server as cache data based on the access pattern and other factors.

Figure 3:
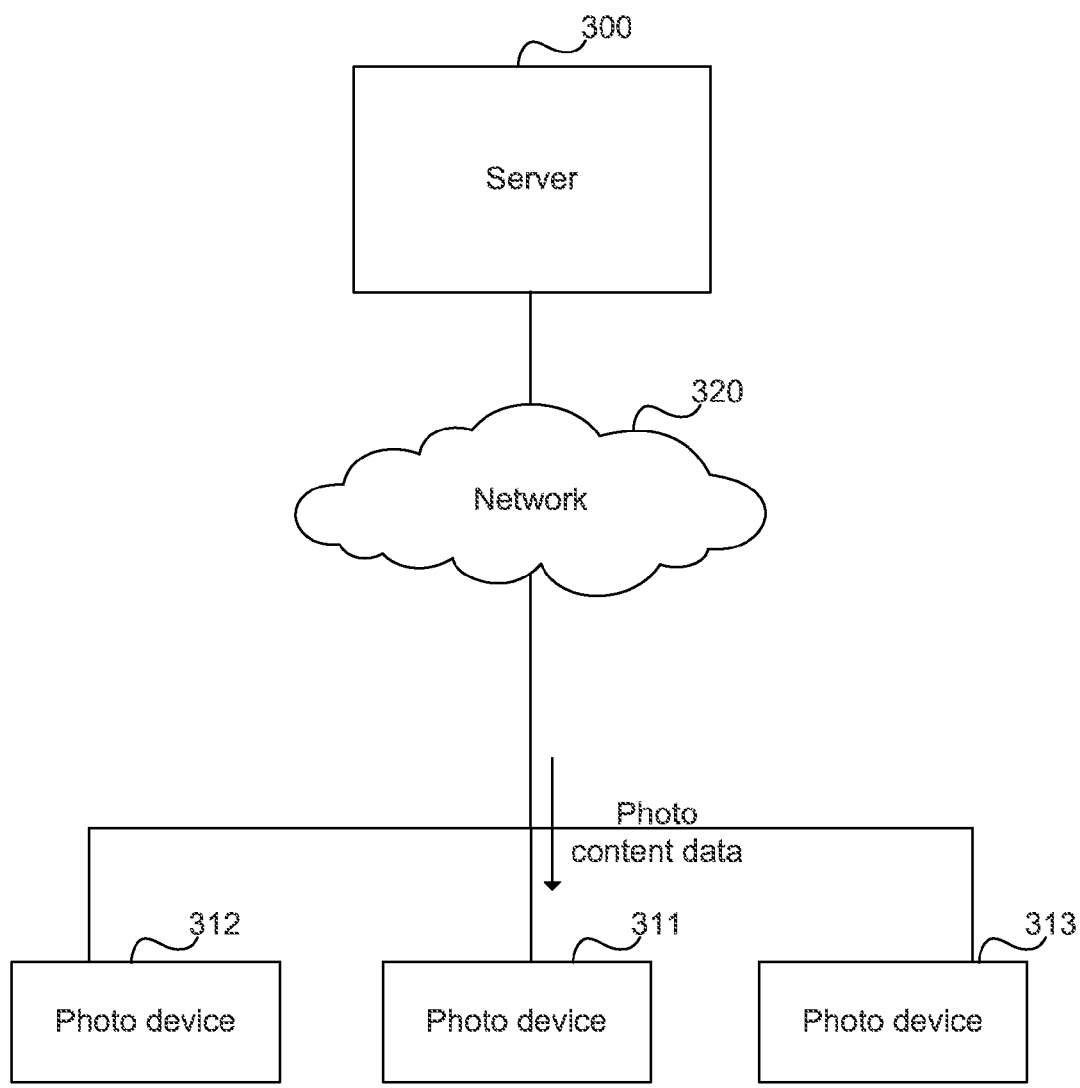
FIG. 3 illustrates an example of photo devices connected to a cloud-based server.

The technology disclosed herein can be applied to various computing devices including, e.g., photo devices. For instance, FIG. 3 illustrates an example of photo devices connected to a cloud-based server. As depicted in FIG. 3, a server 300 may provide a cloud-based service for storing content data of the photo files of the photo devices 311-313. The server 300 can further storing content data of other files of the photo devices, e.g., user profile files, application program files or operating system files. The network 320 can be, e.g., the Internet. Examples of photo devices 311, 312 and 313 may include, but are not limited to, a mobile phone, a smart-phone, a personal digital assistant (PDA), a tablet, a mobile game console, a laptop computer, a desktop computer, or any other devices having communication capability.

The photo device 311-313 stores the metadata, e.g., the exchangeable image file format (EXIF) information and thumbnails of the photo files locally. The server 300 stores the content data of the photo files.

In some embodiments, server 300 may also monitor the file access patterns of the photo devices 311-313 and send content data of the files as cache data. For example, in some embodiments, server 300 may determine or identify, a photo file of photo device 311 that is frequently accessed and likely will be read again in near future. The server 300 may notify the device 311 and send the content data of the photo device 311. The photo device 311 caches the content data of that photo file so that a read request of the photo file can be satisfied locally without sending a request to the server 300.

A person having ordinary skill in the art can readily understands that the types of device illustrated in FIG. 3 can be different. For example, photo devices 311, 312 and 313 can be, e.g., tablets, smart phones or laptop computers respectively. The server 300 is capable of storing content data of files designed for these different types of devices.

Figure 4:
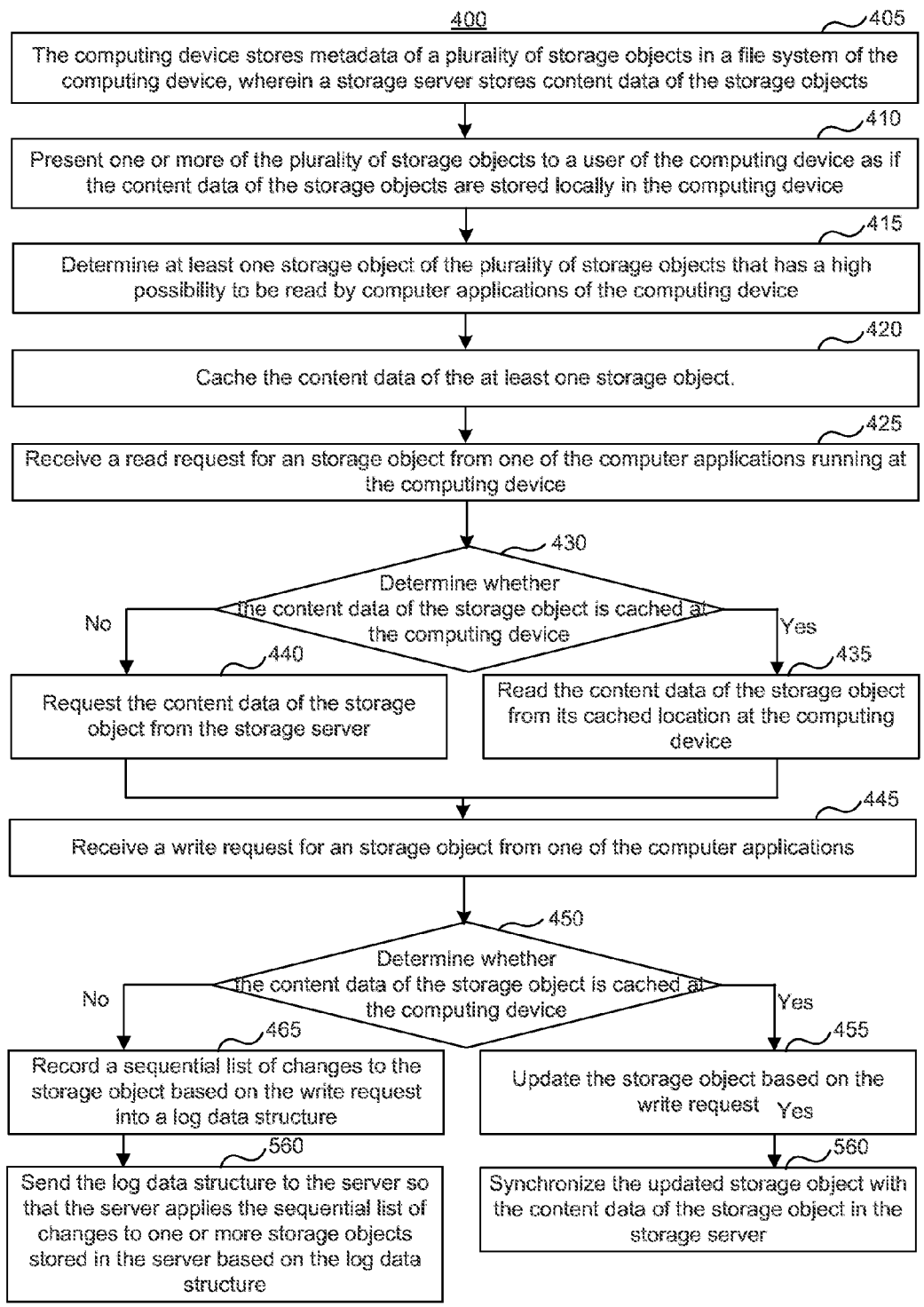
FIG. 4 illustrates an example of a process for managing a device file system integrated with a storage server.

In order to achieve a file system exceeding the storage limit of local storage, the file system of the computing device is integrated with a storage server so that content data of the files can be stored in the storage server. The storage server acts as a remote high-performance scalable surrogate hardware resource for storing the content data of the files. FIG. 4 illustrates an example of a process 400 for managing a device file system integrated with a storage server. The process 400 starts at step 405, where the computing device stores metadata of a plurality of storage objects (e.g. files) in a file system of the computing device, wherein a storage server stores content data of the plurality of storage objects. The computing device may store some of the content data as cache data. At least one of the content data of the plurality of storage objects is not stored locally in the computing device such that a maximum size of the file system can exceed a physical storage limit of the computing device.

The metadata of a storage object can include, e.g., means of creation of data in the storage object, purpose of data in the storage object, time and date of creation of the storage object, creator or author of data of the storage object, location on the storage server where the content data of the storage object are stored, title of the content data of the storage object, an inode data structure of the storage object, version information, or a sample presentation of the content data of the storage object. The sample presentation of the content data of the file can include, e.g., a reduced-size version of the content data, a sample clip or image of the content data, first few bytes of a set of streaming data, or a reduced-data-rate version of the content data.

At step 410, the computing device presents one or more of the plurality of storage objects to a user of the computing device as if the content data of the storage objects are stored locally in the computing device. For instance, the computing device can use an output component to visualize a preview of at least one file of the files using the metadata of the file as if the content data of the file are stored locally in the storage component.

At step 415, the computing device determines at least one storage object of the plurality of storage objects that has a high possibility to be read by computer applications of the computing device. For instance, the at least one storage object that has the high possibility to be read by the computer applications can be determined based on an access pattern to the plurality of storage objects on the computing device. At step 420, the computing device caches the content data of the at least one storage object.

The cached content data can be used for satisfying future read requests. For instance, at step 425, the computing device receives a read request for a storage object from one of the computer applications running at the computing device. At step 430, the computing device determines whether the content data of the storage object is cached at the computing device. If the content data of the storage object is cached at the computing device, at step 435, the computing device reads the content data of the storage object from its cached location at the computing device. If the content data of the storage object is not cached at the computing device, at step 440, the computing device requests the content data of the storage object from the storage server.

At step 445, the computing device receives a write request for a storage object from one of the computer applications. At step 450, the computing device determines whether the content data of the storage object is cached at the computing device. If the content data of the storage object is cached at the computing device, at step 455, the computing device updates the storage object based on the write request. At step 460, the computing device synchronizes the updated storage object with the content data of the storage object in the storage server. If the content data of the storage object is not cached at the computing device, at step 465, the computing device records a sequential list of changes to the storage object based on the write request into a log data structure. At step 470, the computing device sends the log data structure to the server so that the server applies the sequential list of changes to one or more storage objects stored in the server based on the log data structure.

Those skilled in the art will appreciate that the logic illustrated in FIG. 4 and described above, and in each of the flow diagrams discussed below if any, may be altered in a variety of ways. For example, the order of the logic may be rearranged, substeps may be performed in parallel, illustrated logic may be omitted, other logic may be included, etc. For instance, the write request may be received and handled by the computing device before receiving and handling the read request. Alternatively, the write and read requests can be received and handled in separate processes.

Figure 5:
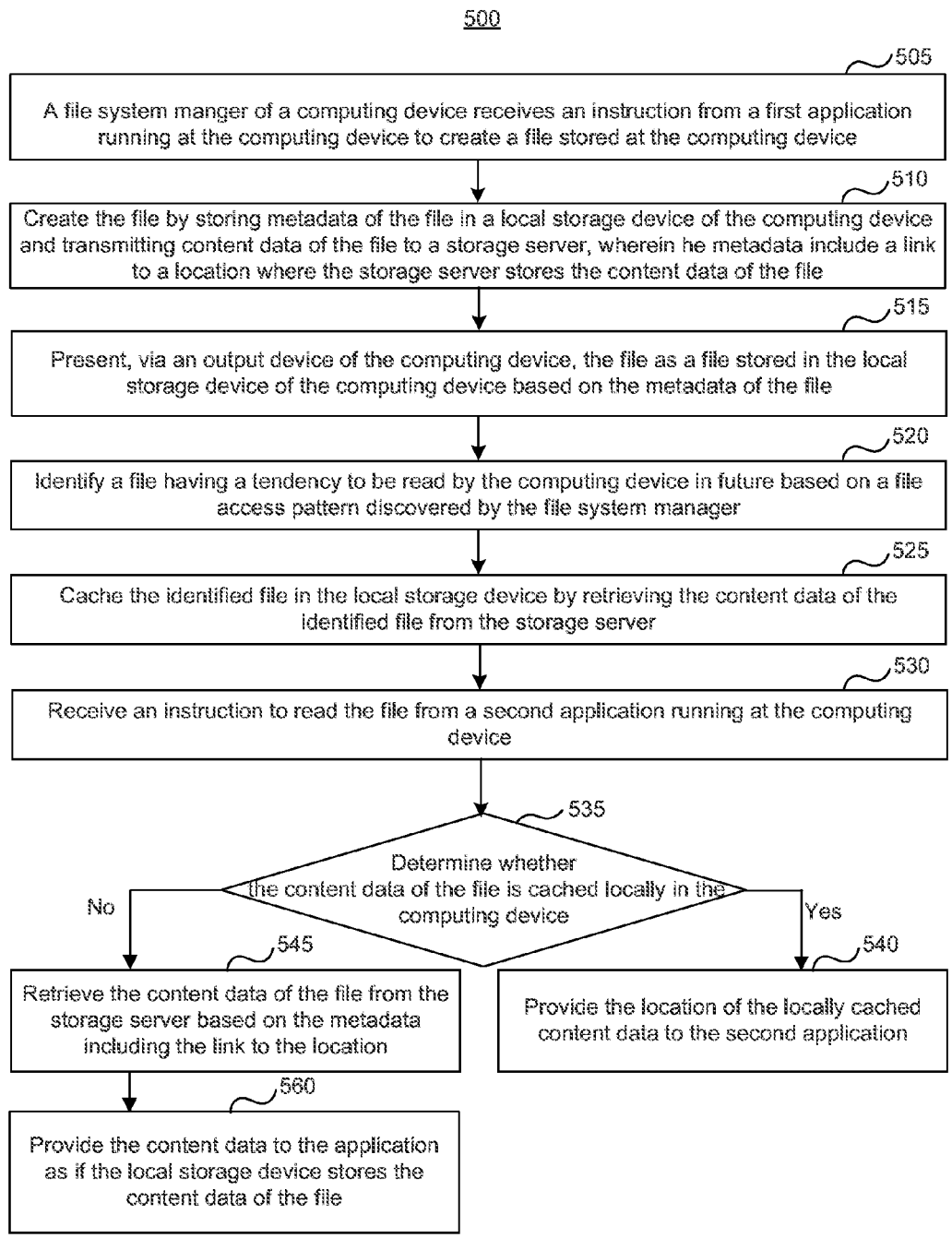
FIG. 5 illustrates an example of an alternative process for a cloud based file system that can surpass device storage limit.

A file system manager of a computing device can be responsible for creating the files in a way that metadata are stored in the local storage and that content data of the files are stored remotely. FIG. 5 illustrates an example of an alternative process 500 for a cloud based file system that can surpass device storage limit. The process 500 starts at step 505, where a file system manager of a computing device receives an instruction from a first application running at the computing device to create a file stored at the computing device. The file system manager maintains a file system including files for the computing device having a total size larger than a storage limit of the local storage device of the computing device.

At step 510, the file system manager creates the file by storing metadata of the file in a local storage device of the computing device and transmitting content data of the file to a storage server, wherein he metadata include a link to a location where the storage server stores the content data of the file. Applications running at the computing device can read files managed by the file system manager of the computing device as if the content data of the files are stored in the local storage device of the computing device. In some embodiments, the storage server stores at least a portion of the metadata of the file as well. For instance, the storage server may store file information data structures (e.g. inodes) for the content data, so that the storage server can identify the files to which the content data belong.

At step 515, the computing device presents, via an output device (e.g. display) of the computing device, the file as a file stored in the local storage device of the computing device based on the metadata of the file. The computing device may display or present, e.g., the filename, the directory in which the file is located, and a preview content (e.g., a thumbnail image or a preview clip) of the file. The user of the computing device perceives that the content of the file is locally stored in the computing device.

At step 520, the file system manager identifies a file having a tendency to be read by the computing device in future based on a file access pattern discovered by the file system manager. The file system manager can identify such tendency in different ways, e.g., as illustrated in diagrams discussed below. At step 525, the file system manager caches the identified file in the local storage device by retrieving the content data of the identified file from the storage server.

At step 530, the file system manager receives an instruction to read the file from a second application running at the computing device. The first application which instructs to create the file and the second application which instructs to read the file may be the same application or different applications. For example, the first and second applications can be the same word processing application that instructs to create and later to read a document file. Alternatively in another example, the first application can be a file explorer application controlled by a user to create a new document file, while the second application can be a separate word processing application to read the document file.

At step 535, the file system manager determines whether the content data of the file is cached locally in the computing device. If so, at step 540, the file system manager provides the location of the locally cached content data to the second application. Otherwise, at step 545, the file system manager retrieves the content data of the file from the storage server based on the metadata including the link to the location. For instance, the file system manager may examine the metadata of the file to identify the location on the storage server where the content data of the file is stored, and then request the content data with the location from the storage server. At step 550, the file system manager provides the content data to the application as if the local storage device stores the content data of the file.

Figure 6A:
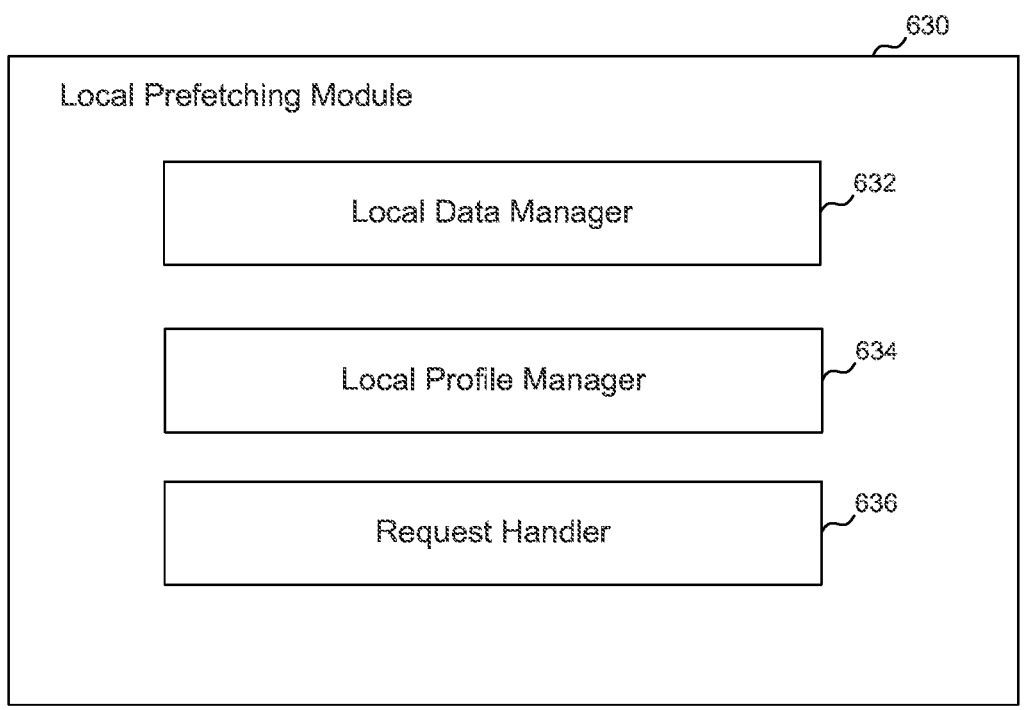
FIG. 6A contains a block diagram illustrating example components of a local prefetching module for an electronic device.

The file system manager may use a local prefetching module to determine the content data of the files to be cached. FIG. 6A contains a block diagram illustrating example components of a local prefetching module 630 for an electronic device. In one embodiment, the local prefetching module 630 includes a local data manager 632, a local profile manager 634 and a request handler 636.

In one embodiment, the local profile manager 634 maintains one or more usage profiles in the primary store and sends them to the prefetching server. It can send the usage profiles periodically, as soon as there is an update, in response to a request from the prefetching server, and so on. FIG. 6B contains a diagram illustrating an example usage profile. A usage profile can contain any information about the activities performed on the electronic device in terms of required files. In one embodiment, the usage profile contains any information on access to the files stored in the primary store. Such information can include the name of a file, the type of the file (partial computer application, full computer application, application data, etc.), the size of the file, the time of access to the file, the type of access (read, write, etc.), the location of the electronic device at the time of access, and so on.

In one embodiment, the local profile manager 634 also receives prefetching profiles from the prefetching server and stores them in the primary store. It can also send requests to the prefetching server for the prefetching profiles periodically, when it has extra bandwidth available, and so on. FIG. 6C contains a diagram illustrating an example prefetching profile. A prefetching profile specifies files to be preloaded on an electronic device in anticipation of the user performing activities which require the files. For each of the specified files, information regarding the name, the type, the size, the access type, the likelihood that it is to be accessed within a predetermined timeframe, etc. can be included.

In one embodiment, the local data manager 632 sends requests to the cloud service to retrieve specific computer applications or application data. It can also send requests to whichever separate servers are hosting the computer applications or application data. In addition, the local data manager 632 receives the requested computer applications or application data and stores them in the primary store or the secondary store on the electronic device. The pace of sending the requests and storing the requested computer applications or application data can depend on where the requested computer applications or application data are to be stored, When they are to be stored in the primary store on the electronic device, it generally means that they are to be accessed immediately and the sending and storing could be performed without much delay, while when they are to be stored in the secondary store, it generally means that they are likely to be accessed in the near future and the sending and storing can be performed with some flexibility in timing.

In one embodiment, given a prefetching profile, the local data manager 302 determines which requests for file retrieval to send and in what order. It may first filter the prefetching profile to remove any file that is already present in the primary store. Next, in one example, it may decide that requests are to be sent for all the files specified in the prefetching profile as the number of such files is small. In another example, it may decide that requests would first be sent for a predetermined number of files with the highest likelihoods or with the shortest time frames. On the other hand, when the size of the secondary store is limited, the local data manager 632 can enforce overwrite policies, such as cache algorithms known to someone of ordinary skill in the art.

In one embodiment, the request handler 636 accepts user requests for certain files and ultimately serves those files from the primary store. In general, it may first look in the primary store, which has pre installed or previously installed files. If the requested file is not there, it looks in the secondary store, which has prefetched files. It saves the requested file in the primary store before serving it in response to user requests.

Figure 6D:
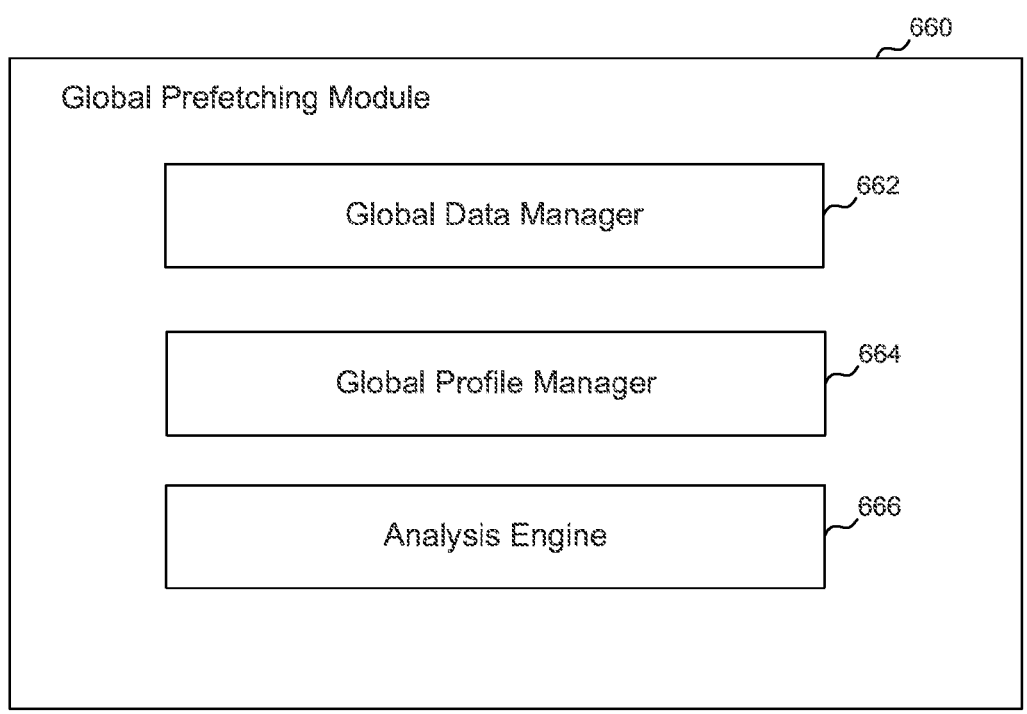
FIG. 6D contains a block diagram illustrating example components of the global prefetching module.

The prefetching server hosts a global prefetching module. FIG. 6D contains a block diagram illustrating example components of the global prefetching module 660. In one embodiment, the global prefetching module 660 includes a global data manager 662, a global profile manager 664 and an analysis engine 666.

In one embodiment, the global data manager 662 receives requests for computer applications or application data from the electronic devices and forwards them to the cloud service or other sources. The global data manager 662 also receives the requested computer applications or application data from the cloud service or other sources and forwards them to the electronic devices. The pace of forwarding the requests and the requested computer applications or application data can similarly depend on where the requested computer applications or application data are to be stored, as discussed above.

In one embodiment, the global profile manager 664 receives usage profiles from the electronic devices and forwards them to the cloud service for storage. It can forward a usage profile to the cloud service immediately upon receiving it from an electronic device. It can also forward the usage profiles received from an electronic device according to a preset schedule. In addition, it can forward the usage profiles received from multiple electronic devices in batches of a predetermined size or periodically. The global profile manager also maintains a global index of usage profiles in the local storage device indicating how to access the usage profiles stored with the cloud service.

In one embodiment, the global profile manager 664 also receives prefetching profiles from the cloud service and forwards them to the electronic devices. Similarly, it can forward a prefetching profile to the appropriate electronic device immediately or in response to a request from the electronic device for a prefetching profile. It can also wait to forward the prefetching profile together with a response to the next request from the electronic device, such as a request to retrieve certain computer application or application data. In addition, it can forward the prefetching profiles to one or more electronic devices according to a predetermined schedule.

In one embodiment, the analysis engine 666 manages analytical algorithms, the input to which are usage profiles and the output from which are prefetching profiles. Many types of analysis can be performed on the usage profiles, individually and collectively, to detect usage patterns (also referred to as data access patterns). According to various embodiments, the usage profiles may indicate that on an electronic device, a computer application or a part thereof is often executed or a piece of application data is often used on a certain day or at a certain time, when the computer application or the piece of application data has a certain size, immediately before or after another computer application or piece of application data, when the electronic device is at a certain location, when another electronic device is connected to the prefetching server, etc. The lack of execution or use can also be incorporated into the usage patterns.

An example usage pattern may include playing video games and the order in which the different levels within the video games are played/accessed. Different levels of a game may often be accessed in an increasing order. The last few very difficult levels may never be accessed, and the levels before the currently accessed levels may also never be accessed again. So, by utilizing the usage profiles, different files can be associated with different access patterns and pre-fetched accordingly without knowing the nature of the files.

In one embodiment, the analysis engine 666 may utilize usage profiles of a computer application executing on multiple electronic devices (e.g., mobile phone) to generate a prefetching profile. For example, the computer application may be a video game with multiple levels, where each level of the game involves accessing a particular subset of files. As part of tracking the usage pattern, the electronic device may track the subset of files being accessed by the video game when a particular level of the game is being played.

In some embodiments, the electronic device may determine the particular level of the game being played (i.e. a current state of the application) by analyzing the data being accessed by the video game. For example, when a video game creates log files to track a player's actions, the data being written to the log file can be analyzed to determine the particular level of the game being played. The electronic device may then track the subset of files being accessed by the video game in association with the particular level of the game being played during the access.

In some embodiments, the analysis engine 666 may utilize usage profiles of a computer application executing on one electronic device to generate a prefetching profile for the computer application executing on a different electronic device. For example, when different levels of the video game are being played in each of the two or more electronic devices, the analysis engine 666 may utilize the usage pattern observed with a previously played game level in one electronic device to generate a prefetching profile for the video game being played on the other electronic devices.

When the game level being played in one electronic device is lower than the previously played game level in another electronic device, the data associated with the later game levels yet to be played in the one electronic device can be prefetched using the data usage pattern observed with the previously played game level in the other electronic device. For example, when a given level in the video game is about to be played, the video game application may fetch a subset of files, e.g., new animated content, game settings file, etc., to setup the game level about to be played. By utilizing the usage pattern from one electronic device, the analysis engine 666 can dynamically learn and update the prefetching profile to be utilized by the application in another electronic device.

Some additional example usage patterns are described as follows. The usage pattern may include photos or soundtracks in an album which are often accessed in the listed order. More recent albums may be accessed more frequently. Larger files may often be accessed on devices with better resources. Business-related files may often be accessed during the day or on an electronic device in the office, while files pertaining to entertainment may often be accessed at night or on an electronic device at home. Best-selling books in a city may be frequently accessed in that city and surrounding cities. Therefore, different files can be associated with different access patterns, which can be learned from the usage profiles without knowing the nature of the files.

In one embodiment, each analytical algorithm takes into consideration one or more of the usage patterns and selects a set of files for an electronic device that are likely to be accessed in the near future on the electronic device. It can assign different weights to different usage patterns. For example, it can prefer usage patterns reflecting more recent activities across electronic devices. It can also give more weight to usage patterns specific to the electronic device and/or those electronic devices owned by users similar to the owner of the electronic device. Furthermore, it can apply any classification, pattern-recognition and other techniques known to someone of ordinary skill in the art.

In one embodiment, the analysis engine 666 chooses one of the analytic algorithms, based on predetermined rules, user input, etc., and submits a request to the cloud service for executing the chosen analytic algorithm. In response, the cloud service executes the chosen analytic algorithm on the stored usage profiles in a distributed manner and generates resulting prefetching profiles for the electronic devices. The analysis engine 666 can submit a request as soon as a predetermined number of updated usage profiles are stored with the cloud service, according to a preset schedule, when the rate of file retrieval is high indicating a low degree of prefetching success, and so on.

Figure 7:
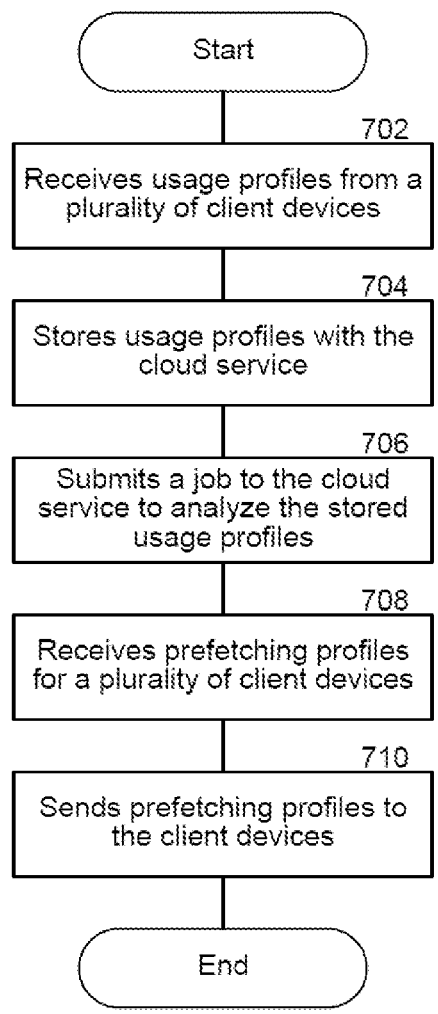
FIG. 7 contains a flowchart illustrating an example operation of a global profile manager.

FIG. 7 contains a flowchart illustrating an example operation of a global profile manager. In one embodiment, the global profile manager receives usage profiles from the electronic devices at step 702. It forwards the usage profiles to the cloud service for storage at step 704. Subsequently, the global profile manager submits a request to execute an analytical algorithm maintained by the analysis engine to the cloud service at step 706. When the execution is complete, the global profile manager receives prefetching profiles for the electronic devices at step 708. Finally, it forwards each of the prefetching profiles to the appropriate electronic device at step 710.

Figure 8:
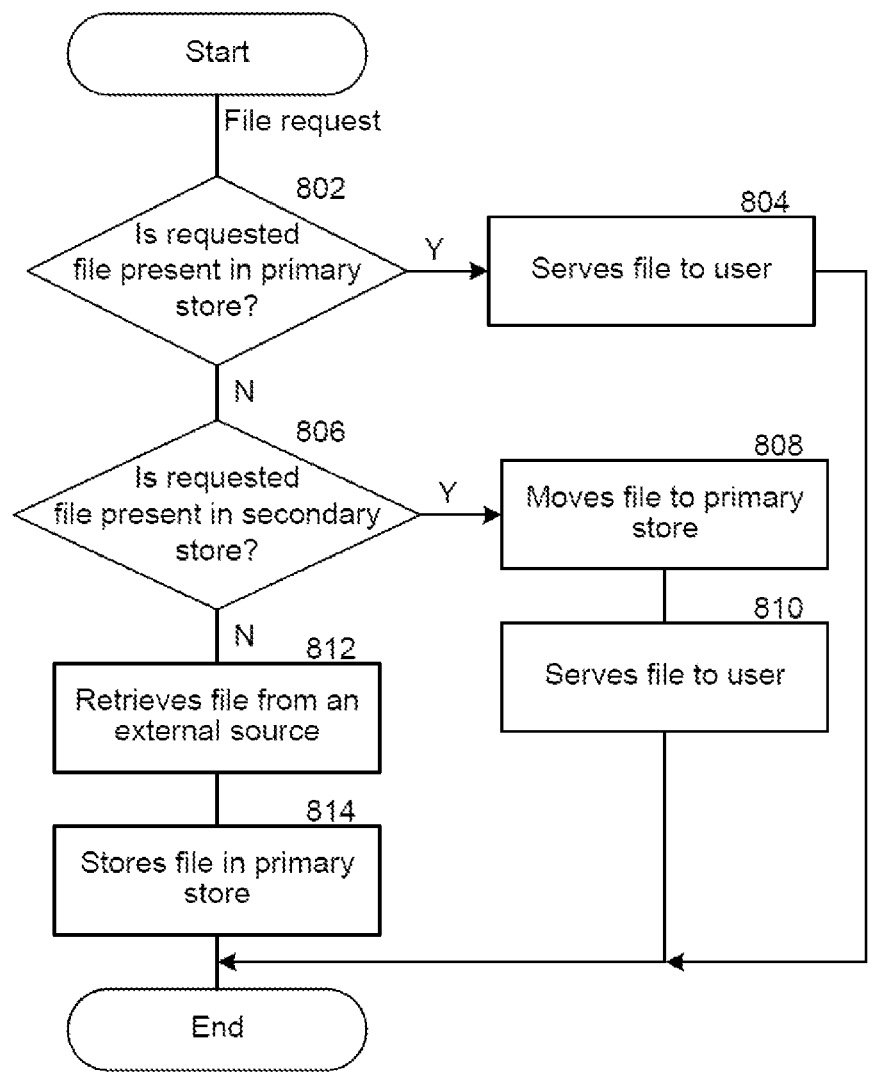
FIG. 8 contains a flowchart illustrating an example operation of the local prefetching module.

FIG. 8 contains a flowchart illustrating an example operation of a local prefetching module. In one embodiment, the request handler accepts a user request and determines whether a requested file is present in the primary store at step 802. If the file is present, it serves the file at step 804. If the file is not present, it determines whether the file is present in the secondary store at step 806. If the file is present, it moves the file to the primary store at step 808 and serves the file at step 810. If the file is not present, the local data manager retrieves the file from a source at step 712 and stores the retrieved file in the primary store at step 714.

Figure 9:
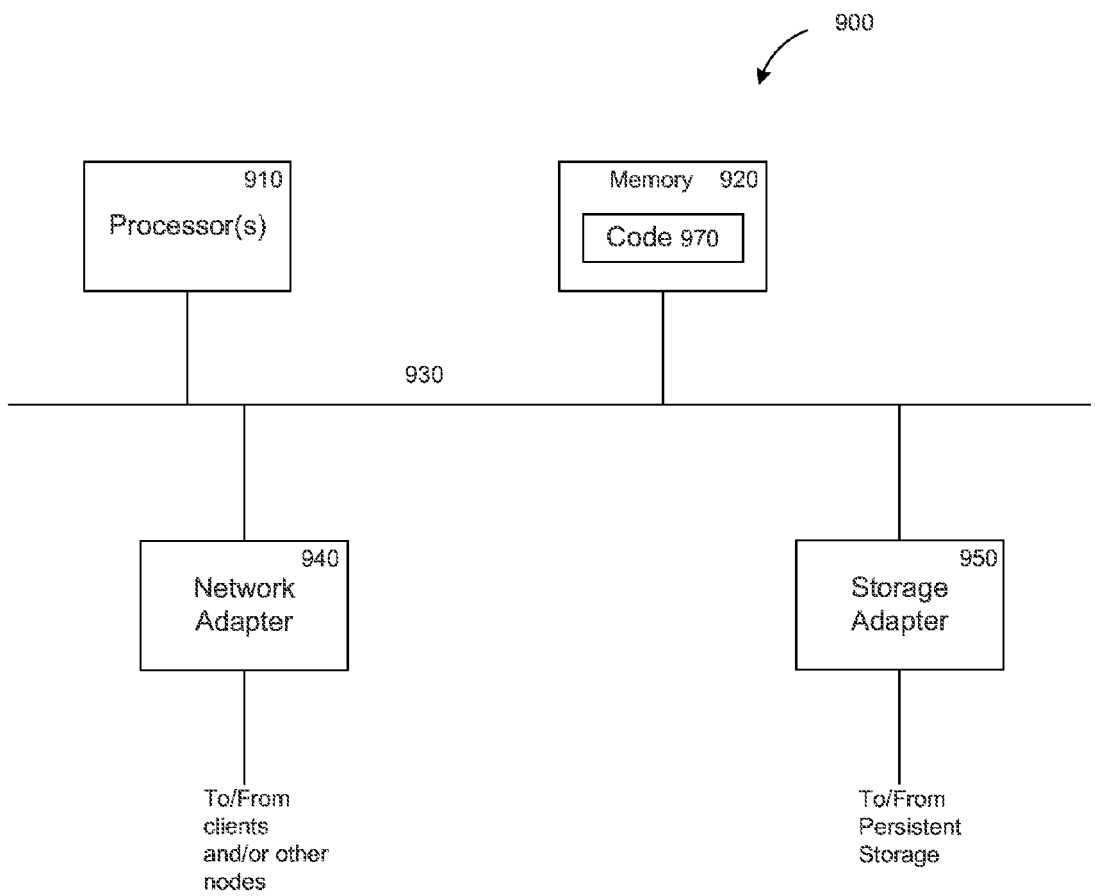
FIG. 9 contains a high-level block diagram showing an example architecture of a computer server, which may represent any computer described herein.

FIG. 9 contains a high-level block diagram showing an example architecture of a computer, which may represent any device, any server, or any node within a cloud service as described herein. The computer 900 includes one or more processors 910 and memory 920 coupled to an interconnect 930. The interconnect 930 shown in FIG. 9 is an abstraction that represents any one or more separate physical buses, point to point connections, or both connected by appropriate bridges, adapters, or controllers. The interconnect 930, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The processor(s) 910 is/are the central processing unit (CPU) of the computer 900 and, thus, control the overall operation of the computer 900. In certain embodiments, the processor(s) 910 accomplish this by executing software or firmware stored in memory 920. The processor(s) 910 may be, or may include, one or more programmable general-purpose or special-purpose microprocessors, digital signal processors (DSPs), programmable controllers, application specific integrated circuits (ASICs), programmable logic devices (PLDs), field-programmable gate arrays (FPGAs), trusted platform modules (TPMs), or the like, or a combination of such devices.

The memory 920 is or includes the main memory of the computer 900. The memory 920 represents any form of random access memory (RAM), read-only memory (ROM), flash memory, or the like, or a combination of such devices. In use, the memory 920 may contain code 970 containing instructions according to the techniques disclosed herein.

Also connected to the processor(s) 910 through the interconnect 930 are a network adapter 940 and a storage adapter 950. The network adapter 940 provides the computer 900 with the ability to communicate with remote devices, over a network and may be, for example, an Ethernet adapter or Fibre Channel adapter. The network adapter 940 may also provide the computer 900 with the ability to communicate with other computers. The storage adapter 950 allows the computer 900 to access a persistent storage, and may be, for example, a Fibre Channel adapter or SCSI adapter.

The code 970 stored in memory 920 may be implemented as software and/or firmware to program the processor(s) 910 to carry out actions described above. In certain embodiments, such software or firmware may be initially provided to the computer 900 by downloading it from a remote system through the computer 900 (e.g., via network adapter 940).

The techniques introduced herein can be implemented by, for example, programmable circuitry (e.g., one or more microprocessors) programmed with software and/or firmware, or entirely in special-purpose hardwired circuitry, or in a combination of such forms. Software or firmware for use in implementing the techniques introduced here may be stored on a machine-readable storage medium and may be executed by one or more general-purpose or special-purpose programmable microprocessors.

A "machine-readable storage medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible storage medium includes recordable/non-recordable media (e.g., read-only memory (ROM); random access memory (RAM); magnetic disk storage media; optical storage media; flash memory devices; etc.), etc.

In addition to the above mentioned examples, various other modifications and alterations of the invention may be made without departing from the invention. Accordingly, the above disclosure is not to be considered as limiting and the appended claims are to be interpreted as encompassing the true spirit and the entire scope of the invention.

What is claimed is:

1. A method for generating a prefetching profile for storage objects associated with an application executing on a computing device, the method comprising:

receiving, by a profile manager, a first storage object access pattern associated with a first instance of the application executing on the computing device, a given storage object access pattern including information regarding an access request for a given storage object from a given instance of the application, the given storage object access pattern including information regarding a current execution state of the given instance of the application during at least one of one or more access requests for storage objects by the given instance of the application;

receiving, by the profile manager, a second storage object access pattern associated with a second instance of the application executing on another computing device;

receiving, by the profile manager, a current execution state of the first instance of the application executing on the computing device;

utilizing the first storage object access pattern and the second storage object access pattern, determining, by the profile manager, one or more future access requests for a subset of storage objects associated with the application, the one or more future access requests being a function of the current execution state of the first instance of the application; and generating, by the profile manager, the prefetching profile utilizing the determined subset of storage objects, wherein the computing device utilizes the prefetching profile and a metadata associated with the storage objects to gather content associated with one or more storage objects of the subset of storage objects, the content associated with the given storage object being stored in a storage server, the metadata associated with the given storage object being stored in the computing device, wherein the computing device includes a first mobile phone, wherein another computing device includes a second mobile phone, wherein the application includes a video game with a plurality of levels, wherein the given execution state includes a given level being played within the video game.

2. The method of claim 1, wherein the current execution state includes a current level being played within the video game, wherein the current level being played in the first mobile phone is different from the current level being played in the second mobile phone, wherein a storage object access pattern associated with the current level being played in the second mobile phone is utilized to determine the prefetching profile provided to the first mobile phone.

3. The method of claim 1, wherein the given data access pattern includes information regarding a number of access requests to a given data block.

4. The method of claim 1, wherein the one or more future access requests being a function of a time of a given day.

5. The method of claim 1, wherein the computing device includes a first mobile phone, wherein another computing device includes a second mobile phone, wherein the application includes a music player, wherein the given execution state includes a given soundtrack being played from a given album with a plurality of soundtracks.

6. The method of claim 5, wherein the current execution state includes a current soundtrack being played from an album, wherein the prefetching profile is determined as a function of the current soundtrack being played in the first mobile phone and an order associated with the plurality of soundtracks in the album.

7. A method for prefetching storage objects associated with an application executing on a computing device, the method comprising:
gathering, by a prefetching module, a first storage object access pattern associated with a first instance of the application executing on the computing device, a given storage object access pattern including information regarding an access request for a given storage object from a given instance of the application, the given storage object access pattern including information regarding a current execution state of the given instance of the application during at least one of one or more access requests for one or more storage objects by the given instance of the application;
providing, by the prefetching module, the first storage object access pattern to a profile manager being utilized to gather storage object access patterns from a plurality of computing devices executing an instance of the application;
providing, by the prefetching module, a current execution state of the first instance of the application executing on the computing device to the profile manager, the profile manager utilizing a plurality of storage object access patterns gathered from the plurality of computing devices and the current execution state of the first instance of the application to determine one or more future access requests for a subset of storage objects associated with the application, the one or more future access requests being a function of the current execution state of the first instance of the application, wherein the profile manager generates a prefetching profile utilizing the determined subset of storage objects;
receiving, by the prefetching module, the prefetching profile from the profile manager, the prefetching module utilizing the prefetching profile and a metadata associated with the storage objects to prefetch one or more storage objects of the subset of storage objects, the prefetching including gathering content associated with the one or more storage objects of the subset of storage objects, the content associated with the given storage object being stored in a storage server, the metadata associated with the given storage object being stored in the computing device, wherein the plurality of computing devices include a first mobile phone and a second mobile phone, wherein the application includes a video game with a plurality of levels, wherein the given execution state includes a given level being played within the video game.

8. The method of claim 7, wherein the current execution state includes a current level being played within the video game, wherein the current level being played in the first mobile phone is different from the current level being played in the second mobile phone, wherein a storage object access pattern associated with the current level being played in the second mobile phone is utilized to determine the prefetching profile provided to the first mobile phone.

9. The method of claim 7, wherein the given data access pattern includes information regarding a number of access requests to a given data block.

10. The method of claim 7, wherein the one or more future access requests being a function of a time of a given day.

11. The method of claim 7, wherein the plurality of computing devices include a first mobile phone and a second mobile phone, wherein the application includes a music player, wherein the given execution state includes a given soundtrack being played from a given album with a plurality of soundtracks.

12. The method of claim 11, wherein the current execution state includes a current soundtrack being played from an album, wherein the prefetching profile is determined as a function of the current soundtrack being played in the first mobile phone and an order associated with the plurality of soundtracks in the album.

13. A non-transitory computer readable storage medium storing computer executable instructions for generating a prefetching profile for storage objects associated with an application executing on a computing device, comprising:
instructions for receiving a first storage object access pattern associated with a first instance of the application executing on the computing device, a given storage object access pattern including information regarding an access request for a given storage object from a given instance of the application, the given storage object access pattern including information regarding a current execution state of the given instance of the application during at least one of one or more access requests for one or more storage objects by the given instance of the application;
instructions for receiving a second storage object access pattern associated with a second instance of the application executing on another computing device;
instructions for receiving a current execution state of the first instance of the application executing on the computing device;
instructions for utilizing the first storage object access pattern and the second storage object access pattern to determine one or more future access requests for a subset of storage objects associated with the application, the one or more future access requests being a function of the current execution state of the first instance of the application; and instructions for generating the prefetching profile utilizing the determined subset of storage objects, wherein the computing device utilizes the prefetching profile and a metadata associated with the storage objects to gather content associated with one or more storage objects of the subset of storage objects, the content associated with the given storage object being stored in a storage server, the metadata associated with the given storage object being stored in the computing device, wherein the computing device includes a first mobile phone, wherein another computing device includes a second mobile phone, wherein the application includes a video game with a plurality of levels, wherein the given execution state includes a given level being played within the video game.

14. The non-transitory computer readable storage medium of claim 13, wherein the current execution state includes a current level being played within the video game, wherein the current level being played in the first mobile phone is different from the current level being played in the second mobile phone, wherein a storage object access pattern associated with the current level being played in the second mobile phone is utilized to determine the prefetching profile provided to the first mobile phone.

15. The non-transitory computer readable storage medium of claim 13, wherein the given data access pattern includes information regarding a number of access requests to a given data block.

16. The non-transitory computer readable storage medium of claim 13, wherein the one or more future access requests being a function of a time of a given day.

17. The non-transitory computer readable storage medium of claim 13, wherein the computing device includes a first mobile phone, wherein another computing device includes a second mobile phone, wherein the application includes a music player, wherein the given execution state includes a given soundtrack being played from a given album with a plurality of soundtracks.

18. The non-transitory computer readable storage medium of claim 17, wherein the current execution state includes a current soundtrack being played from an album, wherein the prefetching profile is determined as a function of the current soundtrack being played in the first mobile phone and an order associated with the plurality of soundtracks in the album.

\* \* \* \* \*